US012292149B1

(12) United States Patent
Loew

(10) Patent No.: US 12,292,149 B1
(45) Date of Patent: May 6, 2025

(54) STUD ISOLATOR WITH NAIL PROTECTION AND SOUND ABATEMENT

(71) Applicant: INP PIPE PRO LLC, Seattle, WA (US)

(72) Inventor: Shannon Alexander Loew, Seattle, WA (US)

(73) Assignee: INP PIPE PRO LLC, Seattle, WA (US)

( * ) Notice: Subject to any disclaimer, the term of this patent is extended or adjusted under 35 U.S.C. 154(b) by 0 days.

(21) Appl. No.: 18/800,467

(22) Filed: Aug. 12, 2024

Related U.S. Application Data

(60) Provisional application No. 63/551,303, filed on Feb. 8, 2024.

(51) Int. Cl.
*F16L 5/00* (2006.01)
*F16L 55/035* (2006.01)
*F16L 55/07* (2006.01)
*F16L 57/00* (2006.01)

(52) U.S. Cl.
CPC ............. *F16L 55/07* (2013.01); *F16L 55/035* (2013.01); *F16L 57/00* (2013.01)

(58) Field of Classification Search
CPC .......... F16L 55/07; F16L 55/035; F16L 57/00
See application file for complete search history.

(56) References Cited

U.S. PATENT DOCUMENTS

| | | | |
|---|---|---|---|
| 630,428 A | 8/1899 | Wahlert | |
| 2,514,504 A | 7/1950 | Moline | |
| 4,023,697 A | 5/1977 | Marrero | |
| 4,309,007 A * | 1/1982 | Logsdon | F16L 55/035 248/74.1 |
| 4,314,687 A * | 2/1982 | Logsdon | F16L 55/035 267/152 |
| 10,555,729 B1 | 2/2020 | Cole et al. | |
| 11,852,273 B1 * | 12/2023 | Loew | F16L 5/10 |
| 2003/0029692 A1 | 2/2003 | Rogner et al. | |
| 2006/0054340 A1 | 3/2006 | Auray et al. | |
| 2007/0278579 A1 * | 12/2007 | Cannistraro | F16L 5/00 257/355 |
| 2010/0071293 A1 * | 3/2010 | Cannistraro | H02G 1/00 403/223 |

(Continued)

OTHER PUBLICATIONS

"SupplyHouse 3/4 Silencer Wood Stud Isolator," http://web.archive.org/web/20160712103428/https://www.supplyhouse.com/Holdrite-262A-3-4-Silencer-Wood-Stud-Isolator (Year: 2016), 4 pages.

*Primary Examiner* — Amy J. Sterling
(74) *Attorney, Agent, or Firm* — Workman Nydegger

(57) ABSTRACT

A stud isolator with integrated nail protection and sound abatement, providing isolation, nail protection and sound abatement in a single device, with installation of a single product. Such an isolator includes an insertion body sized and configured for insertion into the stud bore hole. The insertion body includes a faceplate attached to the front end of the insertion body, so as to serve as a stop and attachment point to the stud, when the insertion body is inserted into the stud bore hole. The insertion body includes a hollow channel for receipt of a plumbing pipe extending through the stud bore hole. In addition, a metal nail protection collar and sound abatement layer are provided received in the insertion body of the isolator, so as to surround the plumbing pipe received in the isolator.

28 Claims, 11 Drawing Sheets

(56) References Cited

U.S. PATENT DOCUMENTS

| | | | |
|---|---|---|---|
| 2010/0253069 A1 | 10/2010 | Bartholoma et al. | |
| 2016/0146386 A1* | 5/2016 | Blake | F16L 33/025 285/45 |
| 2016/0356403 A1* | 12/2016 | Perrigo | B64D 37/00 |
| 2019/0368206 A1* | 12/2019 | Altero-Marquez | E04F 17/08 |
| 2021/0270392 A1* | 9/2021 | Popov | B64C 1/00 |

* cited by examiner

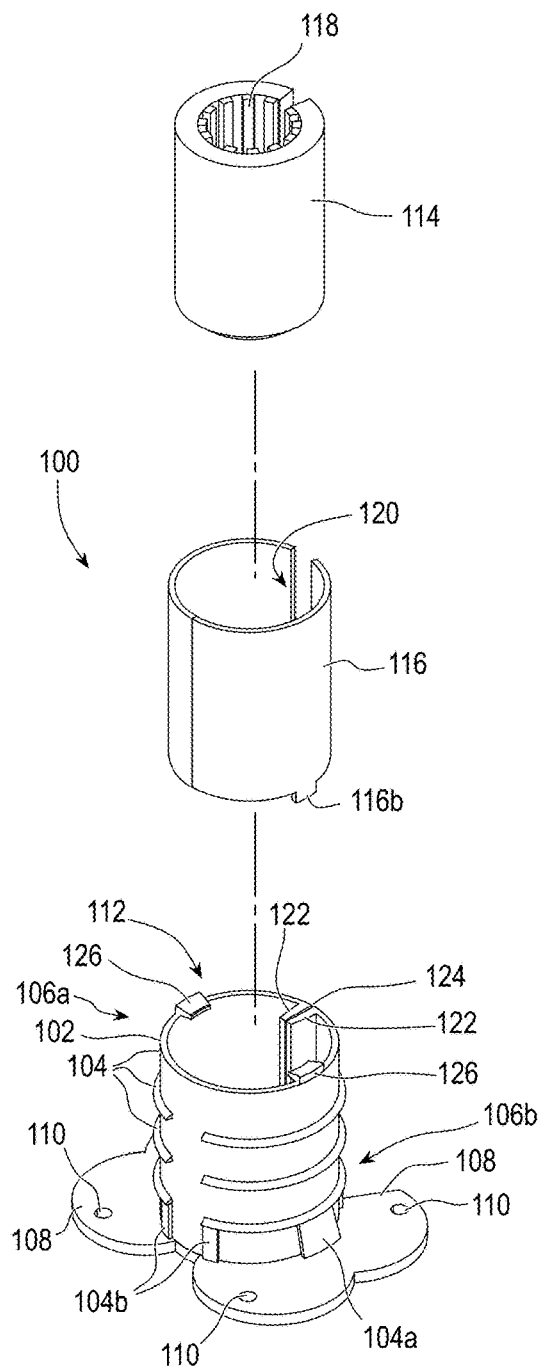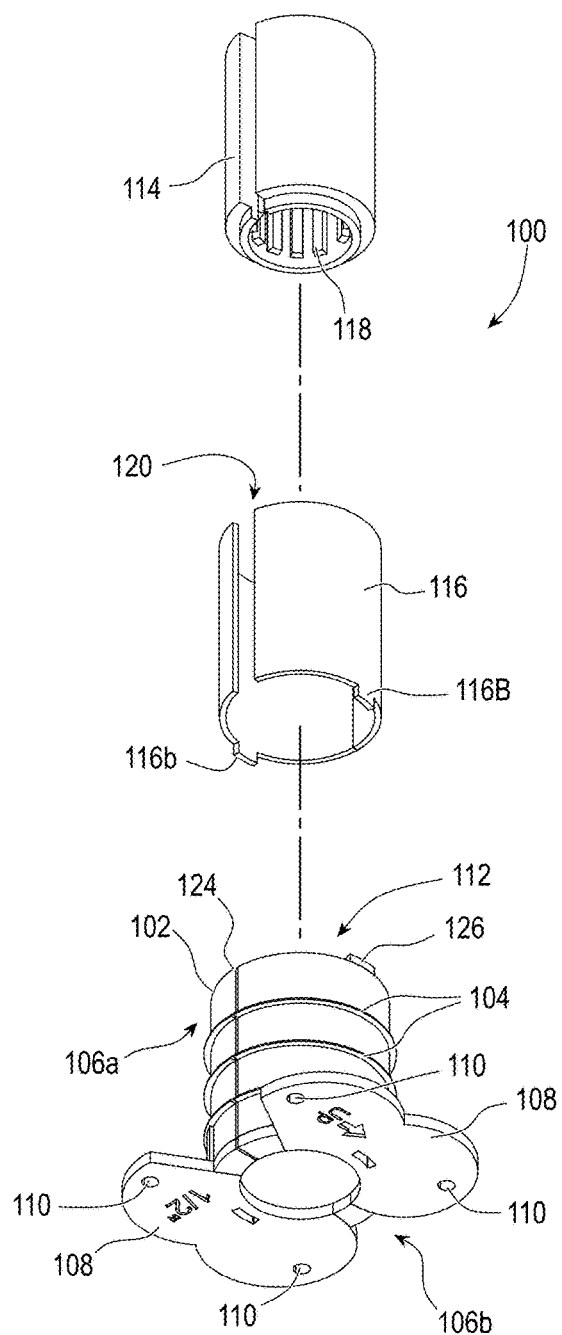
FIG. 2A
FIG. 2B

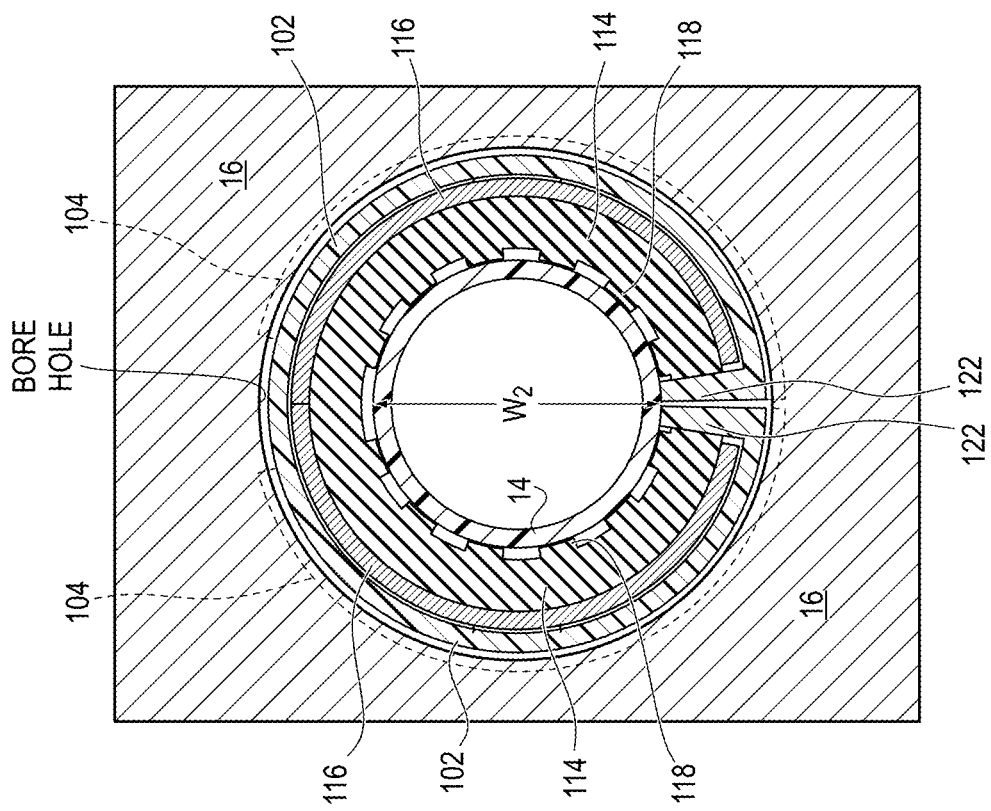
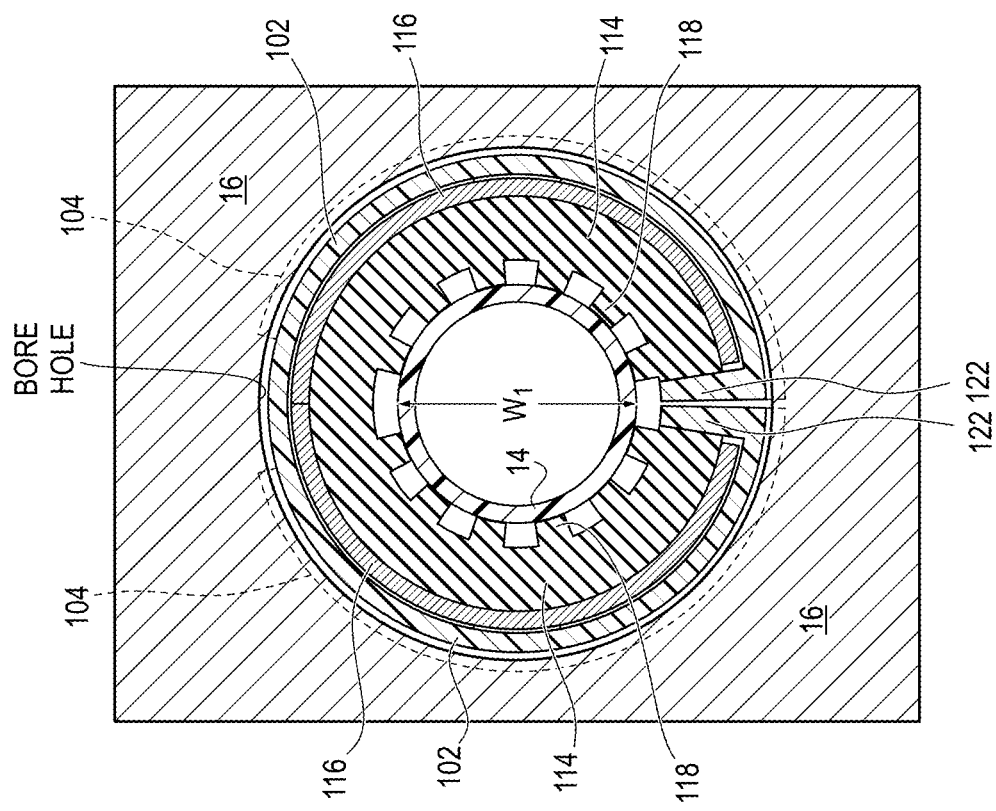

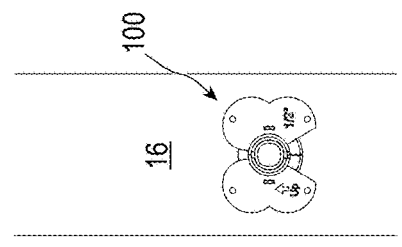
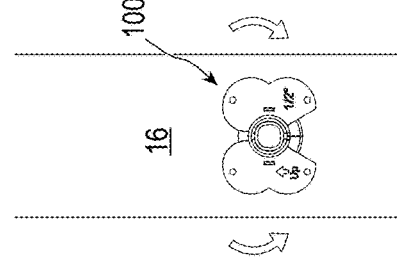
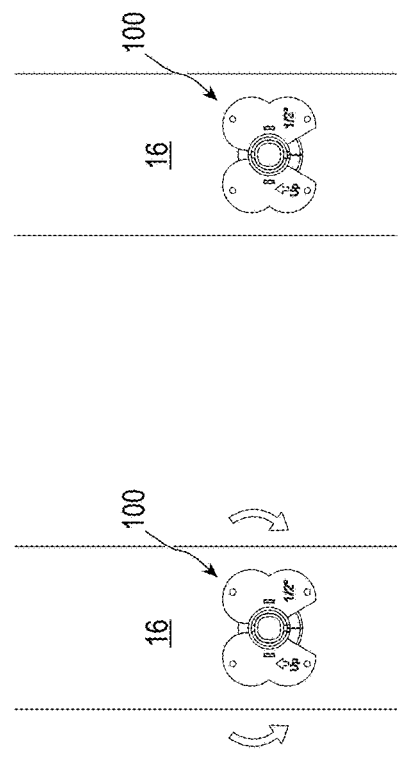
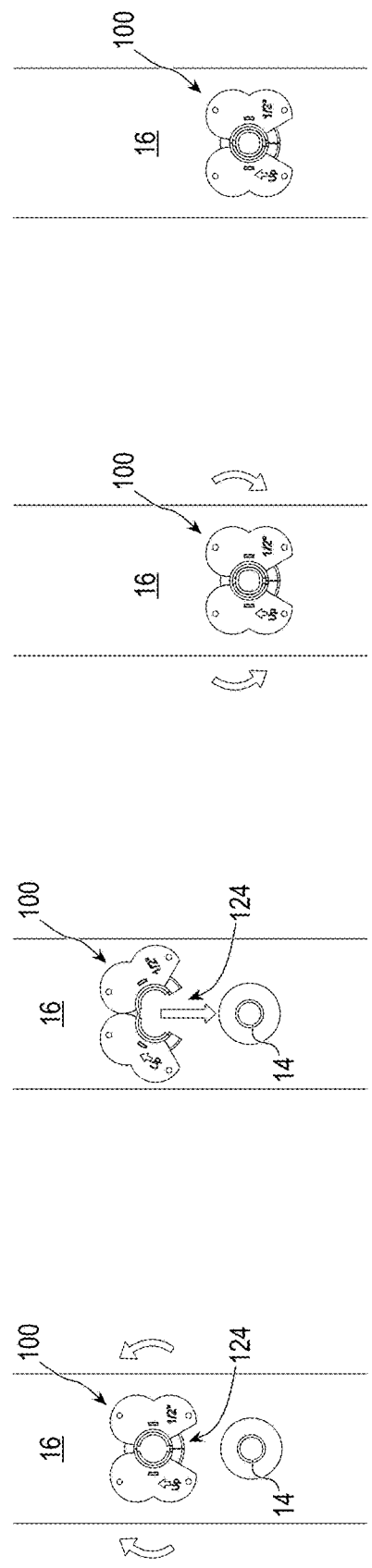
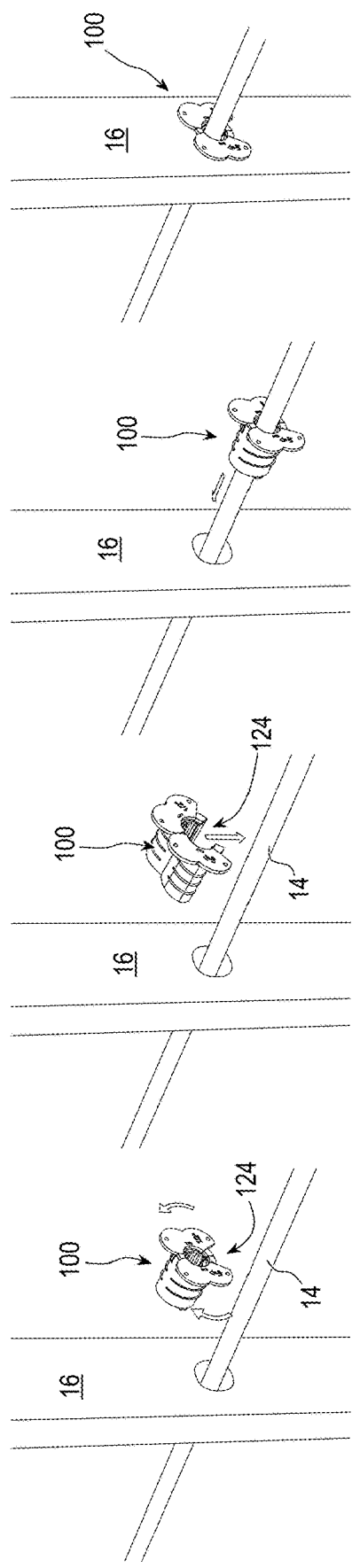

STUD ISOLATOR WITH NAIL PROTECTION AND SOUND ABATEMENT

CROSS-REFERENCE TO RELATED APPLICATIONS

The present application claims the benefit of U.S. Patent Application No. 63/551,303 filed Feb. 8, 2024, entitled STUD ISOLATOR WITH NAIL PROTECTION AND SOUND ABATEMENT, which is herein incorporated by reference in its entirety. Applicant's earlier U.S. Pat. No. 11,852,273 entitled STUD ISOLATOR WITH INTEGRATED NAIL PROTECTION, and U.S. Provisional Application No. 63/356,573 filed Jun. 29, 2022, entitled PIPE HANGAR WITH INTEGRATED NAIL PLATE PROTECTOR, is each herein incorporated by reference in its entirety.

BACKGROUND OF THE INVENTION

1. The Field of the Invention

The present invention is in the field of plumbing isolators (also referred to as insulators), and nail protection for plumbing pipes passing through or adjacent to studs.

2. The Relevant Technology

For commercial and residential construction, the Uniform Plumbing Code (UPC) currently requires two separate measures to protect plumbing embedded in stud walls where pipe passes through studs: isolating the pipe from the stud as it passes through the stud (typically performed by products known as a stud insulator, a pipe insulator, a collar, an insert, or silencer); and protecting the pipe from damage by nail penetrations made into the stud (typically performed by products known as a protector plates, nail plates, stud protector, or stud guard). Both are required in certain construction types, wherever a length of pressurized plumbing pipe or waste line passes through a stud of any type. The current solution for meeting both code-required measures is to install BOTH nail protection in the form of a nail plate on the outside face of the stud AND a stud isolator wrapped around the pipe at each stud. These are two separate products (the isolator and the nail plate), sold separately, and installed in two separate processes.

This is true for all pipe types (e.g. PEX, copper, etc.) and all stud types (e.g. metal stud or wood stud).

In addition, plumbing pipes transmit vibration and noise from water or other materials passing within them during use. This is true for waste, water supply, and other pipes conveying fluid. Associated noise and/or vibration transmits to the stud directly (if mounted directly to a stud), or to the stud via the pipe isolator or hanger. The noise/vibration ultimately creates noise in the inhabitable spaces. Owners and contractors need a noise dampening product to minimize this noise/vibration transfer.

There are limited products currently on the market for this purpose. Sound dampening is also referred to as acoustic rating, however, there is not necessarily any code requirement for this, nor a specified rating.

There is no known product on the market that performs all three functions of: (1) nail protection; (2) stud isolation; and (3) acoustic dampening.

As such, there is a need for improved products and methods, which may simplify current practice, while still meeting UPC requirements.

BRIEF SUMMARY

An embodiment of the present invention is directed to a stud isolator that includes integrated nail protection, providing both isolation, and nail protection in a single device, while at the same time also providing acoustic dampening. Such a device may meet requirements of the UPC or applicable building code (e.g., see UPC 312.9 and UPC 313.0; 313.3), while at the same time providing acoustic dampening, all met with installation of a single device.

The presently described devices can include any or all of the product benefits provided in Applicant's U.S. Pat. No. 11,852,273, in addition to one or more of the following new benefits and features:

- inner most rubber or other elastomeric collar made of a specific rubber or other elastomeric material to dampen sound and reduce pipe vibration and noise, minimizing transfer of each through the stud and into the inhabitable areas of a building;
- interior rubber or other elastomeric collar includes ribs that reduce total surface contact area with the pipe, further reducing noise and/or vibration transfer into the product; and/or
- the front flange of the product includes one or more "peek-a-boo" windows that show the metal nail protection collar, making it easily visible for inspection from both sides of the product even once installed around a pipe and in place in a stud. This feature is newly highlighted because the front flange of the newly shown product is enlarged for additional product rigidity, otherwise hiding the view of the nail protection collar from the front, as compared to the original version shown in U.S. Pat. No. 11,852,273.

An exemplary embodiment of the plumbing stud isolator with integrated nail protection and acoustic dampening (also referred to herein as sound abatement) includes an insertion body sized and configured for insertion into a bore hole through a stud (for example, a drilled hole in a wood stud or a pre-existing, e.g., stamped or punched hole of a metal stud), wherein the insertion body includes a periphery (exterior) that extends towards and/or engages with edges of the bore hole through the stud, the insertion body including an insertion end and a front end. The isolator may include a faceplate attached to the front end of the insertion body, where the faceplate has a size and shape that is larger than the bore hole through the stud, so as to serve as a stop against the stud, when the insertion body of the isolator is inserted into the bore hole through the stud. The faceplate may also serve as an attachment point of the isolator device to the stud (e.g., through nail holes provided through the faceplate). The insertion body includes a hollow channel for receipt of the plumbing pipe to be protected and isolated, that extends through the stud bore hole. In an embodiment, the isolator further includes a sound abatement layer (e.g., formed from an elastomeric material such as silicone, rubber or another elastomer, particularly selected to absorb sound associated with water or other materials flowing through the pipe, that may otherwise be transmitted into the stud, and into the interior of the building). Such a sound abatement layer can be received within the insertion body, at least partially surrounding the hollow channel, so that the sound abatement layer at least partially surrounds (e.g., and contacts) the plumbing pipe during use. A nail protection collar is also provided (e.g., a curved metal nail protection collar), extending around the outside of the sound abatement layer. The sound abatement layer and nail protection collar can be position in the insertion body, so as to extend around the plumbing pipe received through the opening, providing isolation as well as sound abatement, and nail protection to the received plumbing pipe. With the metal nail protection collar and sound abatement layer in position, when the insertion body of the isolator is pressed into the bore hole through the stud, with the plumbing pipe passing through the hollow channel, the pipe is surrounded by the sound abatement layer, and covered by the curved nail protection collar. The sound abatement layer dampens sound that may otherwise be transmitted into the stud from water or other material flowing through the pipe, while the nail protection collar prevents a nail driven through the wall side of the stud from penetrating to the pipe. This satisfies the applicable UPC code requirements, while also providing acoustic dampening. The pipe is firmly held within the hollow channel of the isolator by the sound abatement layer, providing any code required isolation, with sound abatement, and nail protection, all within a single device.

Another embodiment of a plumbing stud isolator with integrated nail protection and sound abatement includes an insertion body sized and configured for insertion into a bore hole through a stud, wherein the insertion body includes a periphery that engages with edges of the bore hole through the stud, the insertion body including an insertion end, a front end, and an open seam, so as to allow the insertion body to be pressed over a plumbing pipe even where an end of the plumbing pipe is not accessible. A faceplate is attached to the front end of the insertion body, wherein the faceplate has a size and shape that is larger than the bore hole through the stud, so as to serve as a stop against the stud, when the insertion body is inserted into the bore hole through the stud. The insertion body includes a hollow channel for receipt of the plumbing pipe extending through the bore hole through the stud, wherein the plumbing pipe is received by the insertion body by spreading at the open seam. A sound abatement layer is received within the insertion body, at least partially surrounding (e.g., and contacting) the plumbing pipe during use, and a metal nail protection collar is also received within the insertion body, radially outward from the sound abatement layer, so that the nail protection collar generally surrounds the sound abatement layer and the plumbing pipe received therein. The metal nail protection collar includes a gap that is aligned with the open seam of the insertion body.

In any of the described embodiments, the sound abatement layer can further include a plurality of pipe engaging ribs (e.g., formed of the same silicone, rubber or other elastomeric material as the sound abatement layer) extending radially inwardly from the sound abatement layer into the hollow channel.

In any of the described embodiments, the nail protection collar can be formed from metal.

In any of the described embodiments, the insertion body can be formed of plastic and is sufficiently flexible so as to allow the insertion body with the metal collar and sound abatement layer received therein to flex open, and be placed over the plumbing pipe. Such may be particularly aided by the open seam of the insertion body, which allows the insertion body to spread open and be pressed over a plumbing pipe even where an end of the plumbing pipe is not accessible. It will be appreciated that the insertion body is more rigid than the sound abatement layer (which may be soft and flexible, to perform its desired function).

In any of the described embodiments, the nail protection collar may advantageously be visible at both the insertion end and the front end of the insertion body. For example, the faceplate at the front end can include one or more cut-outs (e.g., "peek-a-boo cut-outs") that are aligned with the nail protection collar, so as to allow a user to visibly verify that the nail protection collar is properly positioned when viewed from the front end. The nail protection collar is also visible when viewed from the opposite insertion end of the device. This allows verification from either end of the isolator, once the isolator is installed in a stud.

In any of the described embodiments, the nail protection collar can be configured as a generally hollow cylindrical shape. The collar may be configured to include one or more of the following features (i) configured as two initially separate pieces each having a generally c-shaped or generally semi-circular cross section, positioned or positionable with the sound abatement layer into the hollow channel of the insertion body so that the nail protection collar forms a clamshell cylindrical shape once positioned with the sound abatement layer in the insertion body, (ii) configured as a generally hollow cylindrical shape that fits over the sound abatement layer, the generally hollow cylindrical shape including one or more discontinuities or gaps adjacent a top and/or bottom of the nail protection collar. Additional configurations are also possible. For example, a variety of additional nail protection collar configurations (e.g., fixed one-piece collar, hinged collar, boring liner, etc.) are described in Applicant's U.S. Pat. No. 11,852,273, herein incorporated by reference in its entirety.

In any of the described embodiments, the faceplate can include one or more holes therethrough, for receipt of nails, screws or other fasteners to secure the isolator to the face of a stud.

In any of the described embodiments, the insertion body may further comprise one or more retention tabs or clasps at the insertion end for engagement with the nail protection collar and/or sound abatement layer, to retain the nail protection collar and/or sound abatement layer within the insertion body.

In any of the described embodiments, the faceplate can include one or more cut-outs (e.g., "peek-a-boo" cut-outs) that are aligned with the nail protection collar, so as to allow a user to visibly verify that the nail protection collar is properly positioned, when viewed from the front end, once the isolator is installed in a stud.

In any of the described embodiments, the insertion body may include structure for ensuring that the isolator engages and properly nests within the hole of the stud (whether a wood stud or a metal stud). For example, one or more of flexible ridges, biased flanges or registration pads may be provided to ensure the desired engagement and proper nesting within the hole of the stud occurs.

In any of the described embodiments, the isolator may be provided with the nail protection collar and sound abatement layer already received within the insertion body of the device. In another embodiment, such components could be provided separately, for insertion into the insertion body at the time of use.

For example, the isolator may be manufactured using a two-shot injection molding process, where the insertion body is formed of a first plastic material (e.g., rigid plastic), and the sound abatement layer is formed from another material (e.g., an elastomeric material such as silicone). In an embodiment, such two-shot injection molding may occur substantially simultaneously, achieved in a single step. Manufacture using two separate injection molding steps is of course also possible. In an embodiment, the injection molding may occur around the nail protection collar, so that no particular further assembly is required. Manufacture through other techniques may also be possible, e.g., by casting the various components.

Any of the various described embodiments may be inserted around the pipe and be adjusted in location before being inserted into the stud. Any of the various described embodiments may be removed from the stud once inserted and then reinserted as needed in the same or any other location.

The present devices can be used with any type of pressurized or other plumbing pipe (e.g., (e.g. PEX, copper, etc.), as well as any stud type (e.g. metal stud or wood stud), where the requirements of the UPC (e.g., UPC 312.9 and UPC 313.0; 313.3) or similar requirements may be applicable. While no specific standard or requirement may exist for sound abatement, the present devices provide such a benefit, in addition to meeting applicable code requirements for isolation and nail protection. It will be appreciated that such devices may be suitable for use in a wide variety of environments and uses, where isolation, nail protection and sound abatement are desired, whether any of such are required or not (e.g., single family construction, multi-family construction, commercial construction, etc.). It will be appreciated that the isolator is of course suitable in environments where code may require nail protection, but not necessarily stud isolation or sound abatement. By way of example, use of the isolator including the sound abatement layer may be used in a construction to meet any of various building standards (e.g., a LEED standard for noise), or simply to reduce sound transmission, without necessary meeting any particular standard for noise reduction. Where a particular sound abatement rating may be provided in association with use of the present devices, such could be determined using any applicable standard test method, such as any applicable ASTM and/or ISO standardized test.

A method may also be provided, for installing a plumbing stud isolator with integrated nail protection and sound abatement. Such a method may include providing any of the isolators as described herein, and inserting the insertion body with the nail protection collar and sound abatement layer therein into the bore hole of the stud, so as to provide both sound abatement and nail protection to the plumbing pipe, without installation of any nail protection plate over a face of the stud.

Advantageously, any of the various embodiments described herein may be installed in a similar manner as existing isolators, requiring no new tools, skills or certifications.

Features from any of the disclosed embodiments may be used in combination with one another, without limitation. This summary is provided to introduce a limited selection of concepts in a simplified form that are further described below in the detailed description. This summary is not necessarily intended to identify key or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the components and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings.

FIGS. 2A-2B show front and rear isometric views of an exemplary plumbing stud isolator with integrated nail protection and sound abatement according to an embodiment of the present invention, with the nail protection collar and sound abatement layer shown exploded from the insertion body.

FIGS. 5A-5D shows cross-sectional views through the installed isolator, with FIGS. 5A and 5C showing installation with a smaller nominal diameter pipe (e.g., h inch), and FIGS. 5B and 5D showing how the isolator can also be used with a larger nominal diameter pipe (e.g., 4 inch), where the internal ribs of the sound abatement layer can be compressed, to accommodate such a larger pipe.

FIGS. 6A-6H sequentially show exemplary steps associated with installation of the isolator seen in FIGS. 2A-3F.

DETAILED DESCRIPTION OF THE PREFERRED EMBODIMENTS

A. Introduction

Figure 1:
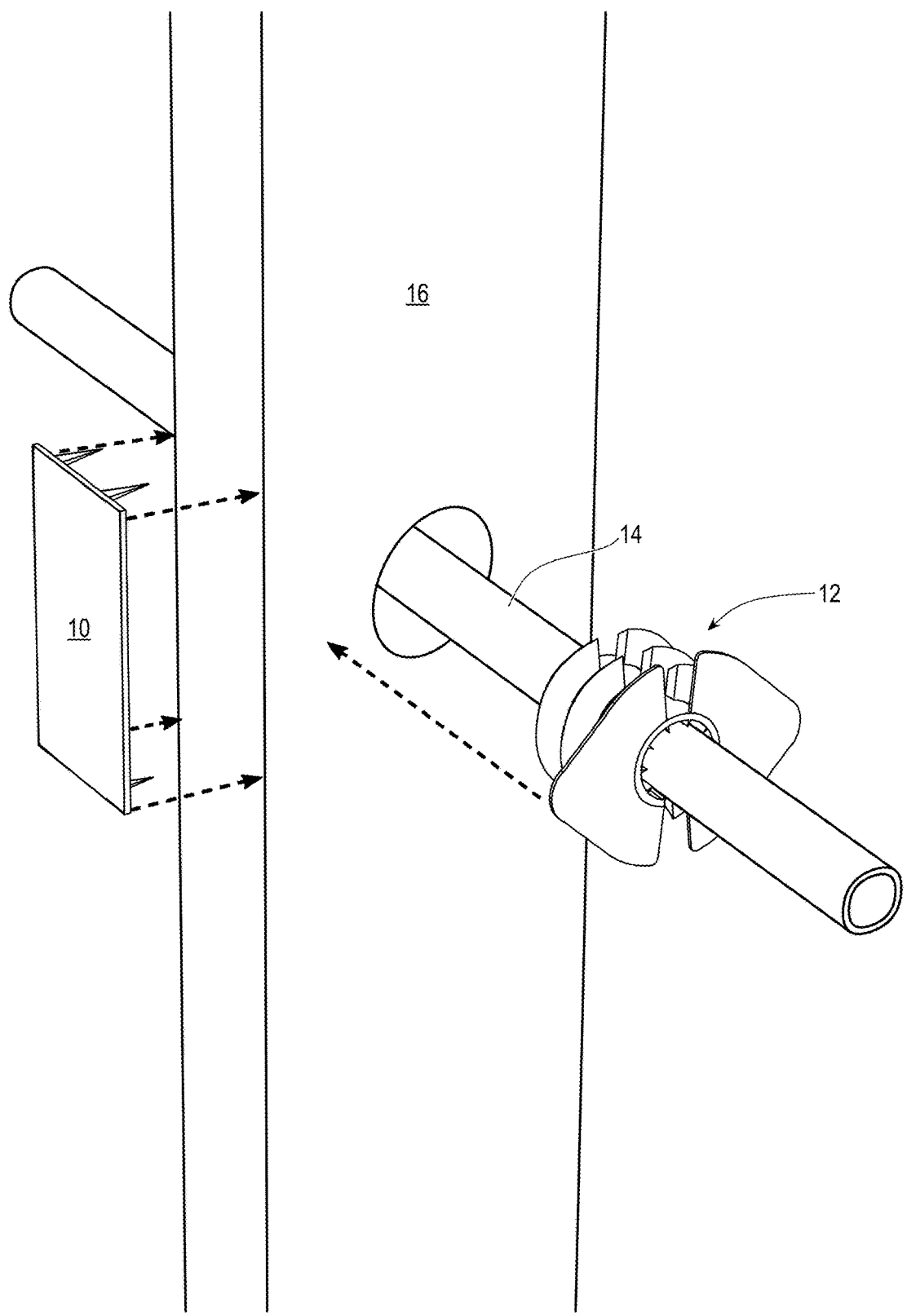
FIG. 1 generally shows how current practice requires the installation of two separate components, in two separate installation steps.

The product described herein is a new product that meets the two separate requirements of the UPC code for pipe isolation and nail protection, while also providing sound abatement. Such is provided within a single product, thus replacing the two separate products for isolating and protecting a length of pipe as it passes through a stud, as currently employed. Such an integrated product may be referred to as a stud isolator with integrated nail protection and sound abatement. Such a product includes a curved metal collar with a specially designed stud isolator (e.g., formed from plastic), with a silicone, rubber or other elastomeric sound abatement layer provided within the plastic stud isolator component, with the nail protection collar positioned radially outside the sound abatement layer, which surrounds the plumbing pipe. The present product allows an installer to meet both code requirements with the use of a single product while also providing sound abatement, where the device can be installed in a single step (rather than the two-steps and two products required for existing solutions). For example, FIG. 1 shows how existing solutions require installation of a nail plate 10, in addition to an isolator 12 to protect plumbing pipe 14 as it passes through stud 16 (e.g., a metal or wood stud). Many such products may not provide any significant sound abatement at all, depending on the materials used. Code dictates that in commercial and multifamily residential construction, both the nail protection (e.g. plate 10) and isolation (e.g. isolator 12) must be provided, at each location where such a pipe passes through a stud. Single family residential construction typically requires only nail protection. Of course, code requirements can change. In any case, the present device can be used in any such type of construction, to provide isolation, nail protection, and sound abatement, all within a single device.

B. Exemplary Devices and Methods of Use

FIGS. 2A-2D illustrate an exemplary isolator 100 including integrated nail protection, eliminating the need for any separate nail plate 10, such as that shown in FIG. 1. Isolator 100 advantageously also provides sound abatement, in addition to isolation and nail protection. Isolator 100 is shown as including an insertion body 102 sized and configured for insertion into a bore hole through a stud (e.g., stud 16 of FIG. 1). For example, in an embodiment, the insertion body 102 may have a diameter so as to snuggly fit (e.g., friction fit) within a standard 1⅜ inch stud boring hole. It will of course be appreciated that sizes could be altered, or devices provided in different sizes, for compatibility with different bore hole sizes. Similarly, the insertable length of the insertion body 102 may be such as to protect the full length of a boring hole through a standard 2×4 or 2×6 stud (both of which are about 1½ inches thick). Insertion body 102 may include a periphery (e.g., a plurality of radially outward extending flexible ridges 104), which engages with the edges of the bore hole through the stud during use. In addition to flexible ridges 104, insertion body 102 may further or alternatively include one or more biased flanges 104a and/or register pads 104b adjacent faceplate 108, at the front end 106b of insertion body 102. Such flanges 104a may be configured to engage with the edge of a metal stud, and register pads 104b may ensure that isolator 100 properly nests into the hole of the metal stud, helping to keep the isolator in place, relative to the thin wall associated with a hole of a metal stud. Thus, even if flexible ridges 104 may not engage with such a metal stud (which may typically be hollow), the flanges 104a and register pads 104b will provide the desired engagement and nesting, so that the isolator is compatible with both wood studs (engagement provided by ridges 104) and metal studs (engagement and nesting provided by flanges 104a and register pads 104b). Insertion body 102 includes an insertion end 106a, and a front end 106b. Isolator 100 is shown as further including a faceplate 108 attached to the front end 106b of insertion body 102. The faceplate 108 may be sized and shaped so as to be larger than the bore hole through the stud, so as to serve as a stop against the major planar face of the stud, when the insertion body is inserted into the bore hole through the stud during use. The faceplate 108 may further include one or more holes 110 therethrough, for receipt of nails 110a (FIG. 4C) or other fasteners to secure the isolator 100 to the major planar face of the stud.

Insertion body 102 further includes a hollow channel for receipt of the plumbing pipe 14 (FIGS. 4A-4C) to be protected and isolated, which extends through the bore hole through the stud. The illustrated embodiment of isolator 100 further includes a sound abatement layer 114, as well as a nail protection collar 116 that are received into insertion body 102, so as to surround the pipe 14. Sound abatement layer 114 may contact the pipe 14, absorbing and dampening sound emanating therefrom (e.g., when water and other materials flow therethrough). The nail protection collar 116 is positioned radially outward from sound abatement layer 114, preventing puncture of the pipe, from a nail that may be driven through the minor face of the stud, after installation of the pipe and isolator. Advantageously, such nail protection is achieved without the need for any planar metal plate fastened over the minor face of the stud, as is conventionally done. Such plates require a separate step for installation, and result in an uneven surface along the minor face of the stud, resulting in bending of the drywall or other wallboard applied thereover. In addition, the configuration as described herein allows the drywall or other wallboard installer to use the entire face of the stud for fastening the drywall without risk of damaging pipe passing through a stud, making that construction process faster and easier. In addition, an owner or renter may use the entire stud surface for attachment (e.g., of pictures, TVs, wall hangings, etc.), without risk that a conventional metal plate will be hit at any given location, while at the same time providing full protection to the pipe running through such stud. Another benefit provided by eliminating the conventional metal stud plate is that in the event of a remodel, where new plumbing pipes are run, there is no need to tear out the drywall on the opposite wall face, to protect newly installed plumbing. Such requirement can be particularly costly and wasteful where the remodel does not otherwise affect the other side of the wall.

As perhaps best seen in FIGS. 2A-2B, nail protection collar 116 may include one or more tabs 116b, which engage with cut-outs 116a (FIG. 3A) formed in face plate 108 of isolator 100. Such tabs 116b may aid in ensuring proper rotational alignment of collar 116 relative to cut-outs 116a, as well as proper rotational alignment of gap 120 with projections 122 and associated open seam 124.

The isolator 100 shown in FIGS. 2A-2D further includes a plurality of flexible pipe engaging ribs 118 extending radially inward from the sound abatement layer 114, into hollow channel 112. Such ribs may be sized and configured in any way desired, e.g., to contact plumbing pipe 14, providing sound abatement thereto. By way of non-limiting example such ribs 118 may run longitudinally relative to pipe 14, they may run radially relative to pipe 14, or otherwise. Any number of such ribs may be provided. Other radially inwardly directed projections (e.g., bumps) could alternatively or additionally be present, and such are within the scope of the term "ribs" as used herein. Applicant's U.S. Pat. No. 11,852,273, describes a configuration that can accommodate different diameters of plumbing pipe 14, so that ribs 118 engage and isolate pipe 14, whether such pipe is relatively larger, or smaller. Such configurations may also be possible with the presently described device. For example, an exemplary isolator may accommodate both nominal ⅝ inch pipe, as well as nominal ⅞ pipe (e.g., h inch or ⅞ inch copper or PEX pipe). Alternatively, different isolators can be provided, where the sound abatement layer 114 is particularly sized for a given nominal pipe size. Where a single isolator may accommodate two pipe sizes, the ribs 118 may simply be compressed by pipe 14, when used with the larger pipe size. Such is possible due to the flexible, elastomeric characteristics of such ribs 118 and sound abatement layer 114. In any case, the sound abatement layer 114 may be formed from a softer sound dampening silicone, rubber or other elastomeric material, such as a relatively low durometer material, e.g., such as a Shore A value of about 60 or less, such as from 0 to about 60, from about 10 to about 50, from about 20 to about 50, from about 30 to about 50, or from about 30 to about 40 (e.g., about 45), or perhaps a Shore OO value of less than about 100, such as from 20 to about 90, from about 30 to about 90, or from about 40 to about 90, or about 70 to about 90. In any case, the material will be such so as to provide desired sound abatement performance criteria. As shown, the sound abatement layer 114 rings the inside of the device, around the plumbing pipe, while the nail protection collar 116 rings the outside of the sound abatement layer, sandwiched between the insertion body 102 and the sound abatement layer 114.

As shown in FIGS. 3A-3D, in an embodiment, the isolator 100 may be configured to allow the user to easily visually verify that the nail protection collar is in place, even when the isolator is installed within the stud bore hole. This may be achieved by ensuring that the curved nail protection collar 116 is visible at both the insertion end 106a and the front end 106b of insertion body 102. The face plate 108 may advantageously include one or more "peek-a-boo" cut-outs 116a aligned with the underlying metal nail protection collar, to allow visibility of such collar, even from the front. These features allow the user (e.g., installer or building inspector) to quickly verify that the nail protection collar is in fact installed correctly. In particular, where the nail protection collar includes tabs 116b, it may be the tabs 116b that are received in and visible through cut-outs 116a.

Figure 2C:
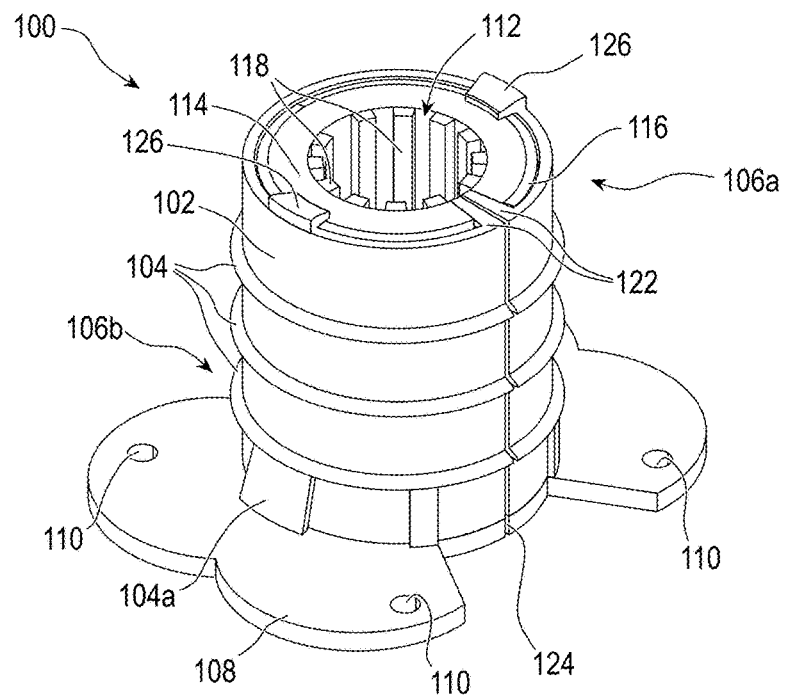
FIGS. 2C-2D show front and rear isometric views of the exemplary plumbing stud isolator with integrated nail protection and sound abatement of FIGS. 2A-2B, with the nail protection collar and sound abatement layer received into the insertion body.
Figure 2D:
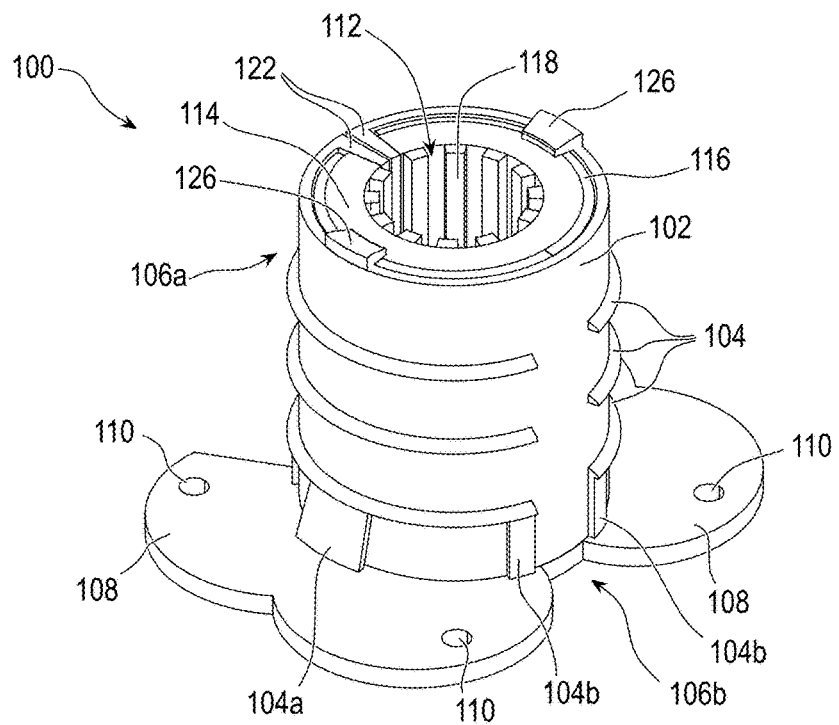
Figure 3A:
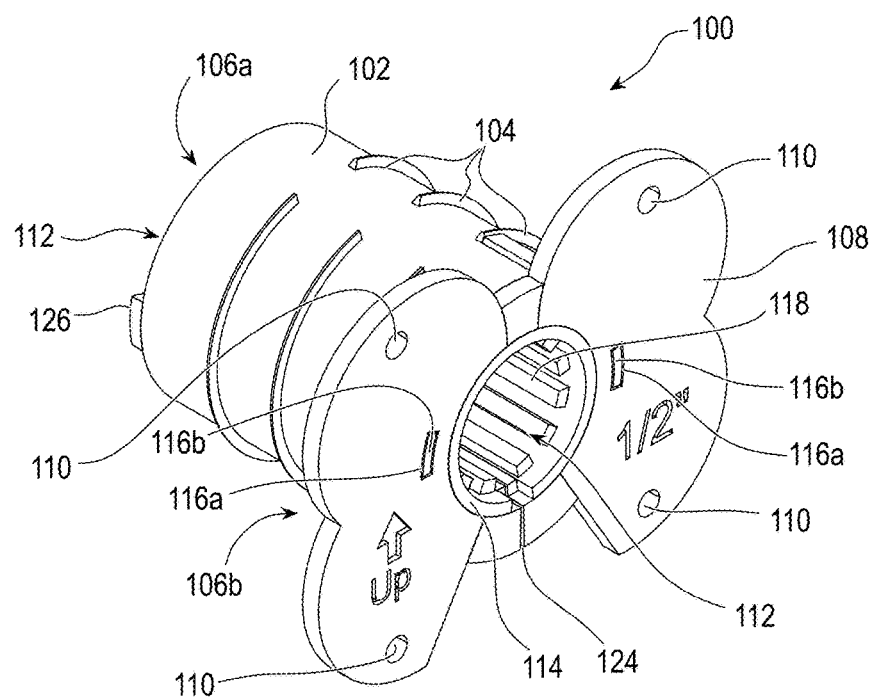
FIG. 3A-3F show additional isometric views of the isolator of FIGS. 2A-2B, ready for positioning over a plumbing pipe, and insertion into a bore hole through a stud.
Figure 3B:
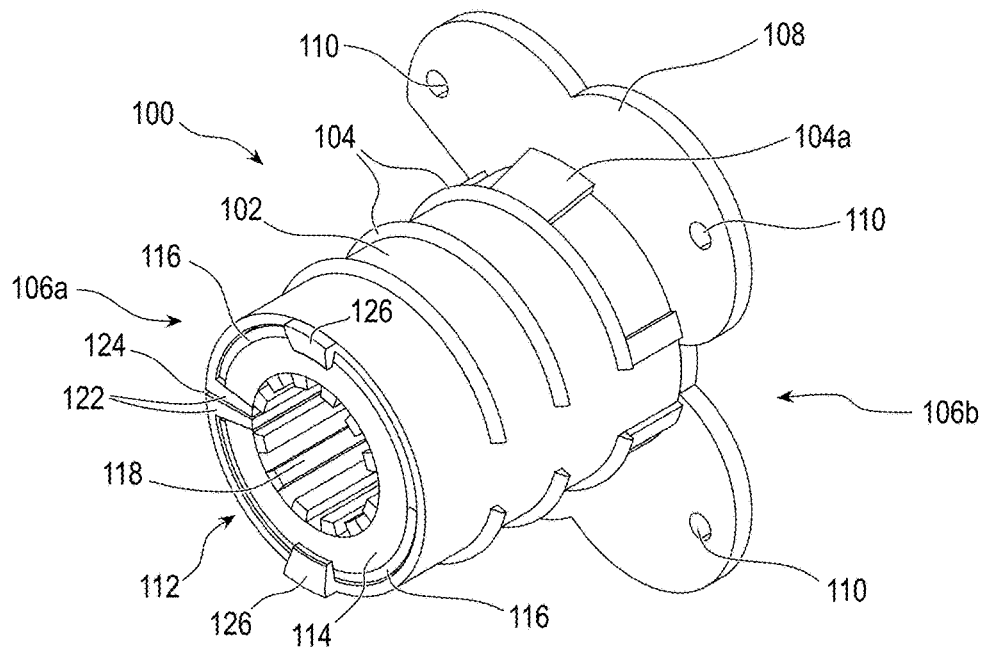
Figure 3C:
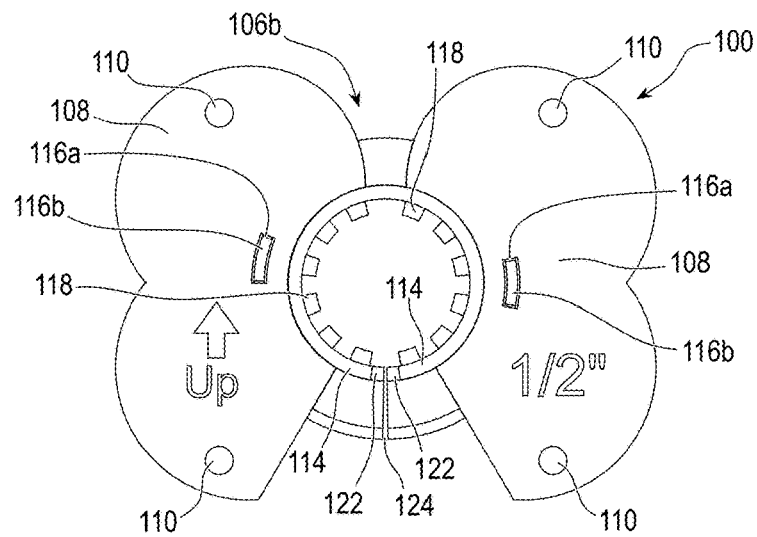
Figure 3D:
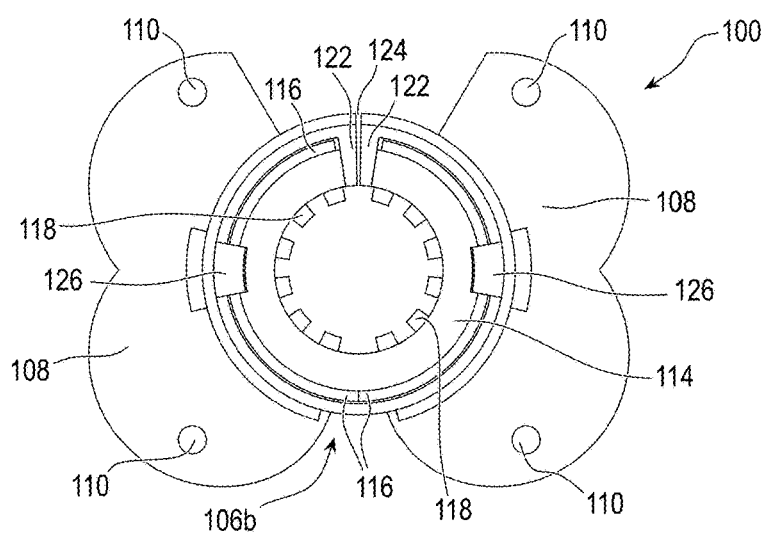
Figure 3E:
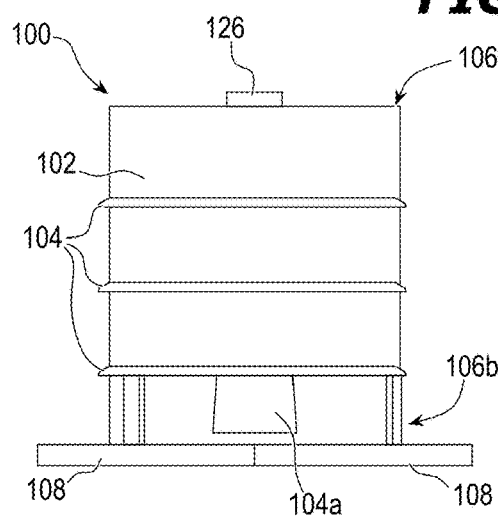
Figure 3F:
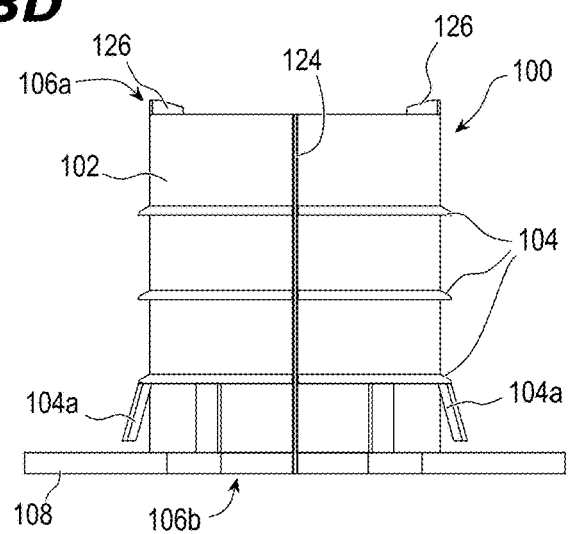
Figure 4A:
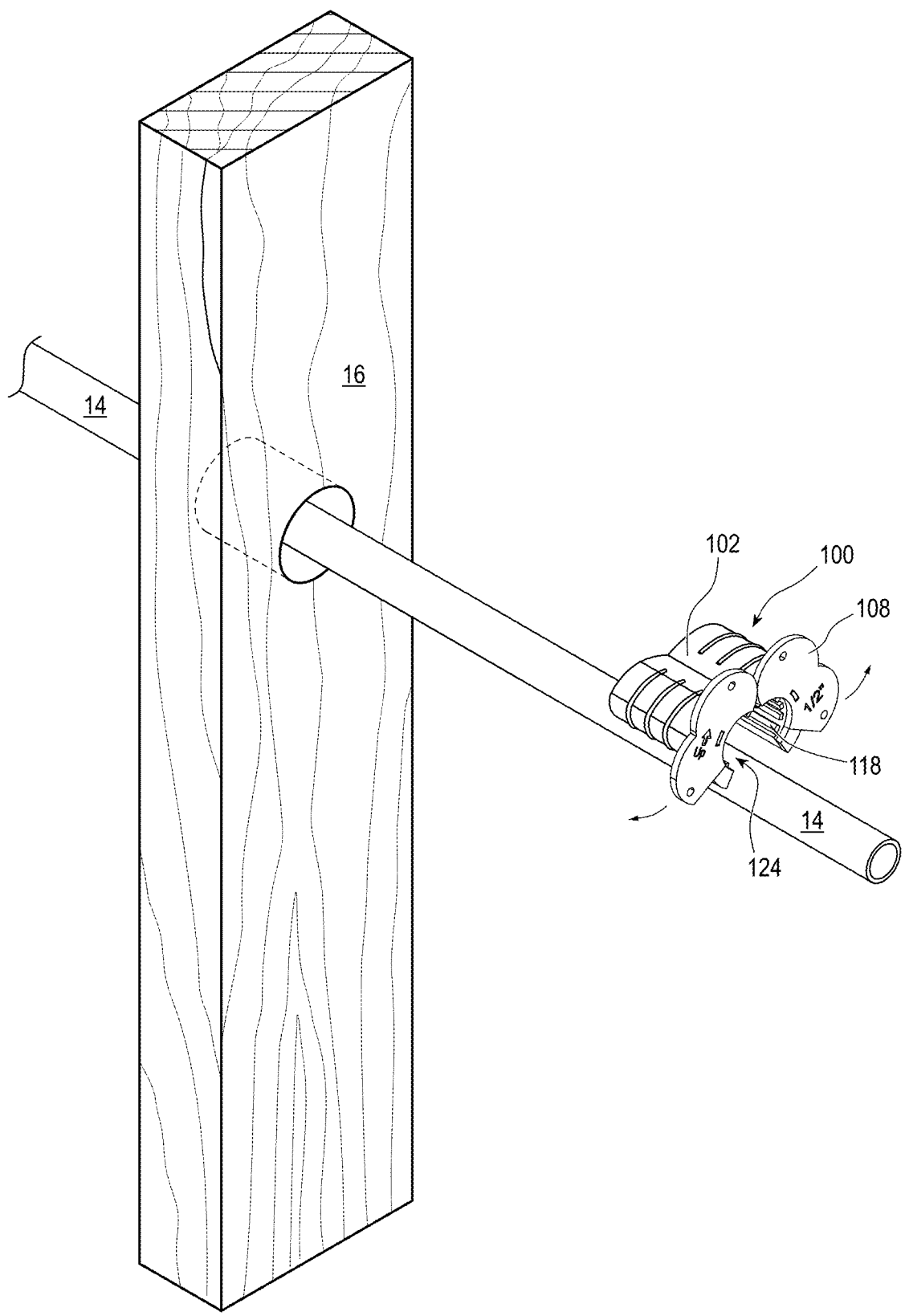
FIG. 4A shows the isolator of FIGS. 3A-3F positioned adjacent to a pipe to be protected, before the pipe is received within the hollow channel of the isolator.

As shown in FIGS. 2A-2B, in an embodiment, the nail protection collar 116 may be configured as a plurality (e.g., two) of initially separate pieces, forming a "clamshell", where such pieces are positioned with the sound abatement layer 114 into the hollow channel of the insertion body, as shown in FIGS. 2C-2D. As shown, the two separate pieces may be generally c-shaped in cross-section, so as to surround the hollow channel 112 and the received plumbing pipe, during use. As shown, in an embodiment, the nail protection collar 116 may stop somewhat short of providing a full circular encompassing of the hollow channel 112. Such a gap 120 may accommodate, receive and mate with an inwardly oriented projection 122 of the insertion body 102, as shown. Projections 122 also correspond to an open seam 124 which allows the isolator 100 to "open up", or spread open, e.g., as shown in FIG. 4A, for easier placement of the isolator 100 over the plumbing pipe 14. Advantageously, where the nail protection collar 116 is configured as two separate pieces, they may be identical to one another or mirror images of one another. By providing two separate pieces that are identical to one another, manufacturing is simplified, as only a single geometry piece is required (rather than requiring stocking two different geometry pieces).

Insertion body 102 may include one or more flexible retention tabs or clasps 126 (e.g., perhaps best seen in FIG. 3B and the cross-section of FIGS. 5A-5B) which help to secure and retain nail protection collar 116 and/or sound abatement layer 114 within the insertion body 102, once inserted. For example, the curved collar 116 (e.g., two c-shaped generally semicircular cross-section pieces) and sound abatement layer 114 may be inserted into insertion body 102 from the insertion end 106a, towards the front end 106b, until curved collar 116 and/or sound abatement layer 114 reaches the rear of faceplate 108. Tabs or clasps 126 may flex to allow insertion, and once the collar 116 and sound abatement layer 114 are fully inserted, they may snap outward, so as to retain the nail protection collar 116 and/or sound abatement layer 114 in place. Such assembly may typically be performed by the manufacturer prior to product sale, rather than by an end user. In another embodiment, the isolator 100 can be formed using a two-shot injection molding process, where the injection molding may even occur around the nail protection collar 116. For example, one shot may be used to form the insertion body (e.g., from a rigid plastic) while the second shot may be used to form the sound abatement layer 114 (e.g., from a silicone, rubber, or other elastomeric material). Such injection molding can be performed around the metal nail protection collar, so that no further particular assembly is required. Alternatively, the insertion body and sound abatement layer can be injection molded or otherwise formed, and then the nail protection collar inserted (e.g., by placing the nail protection collar 116 over the sound abatement layer 114, and then inserting the combined nail protection collar and sound abatement layer into the insertion body). Manufacture through other techniques may also be possible, e.g., by casting the various components.

Figure 4B:
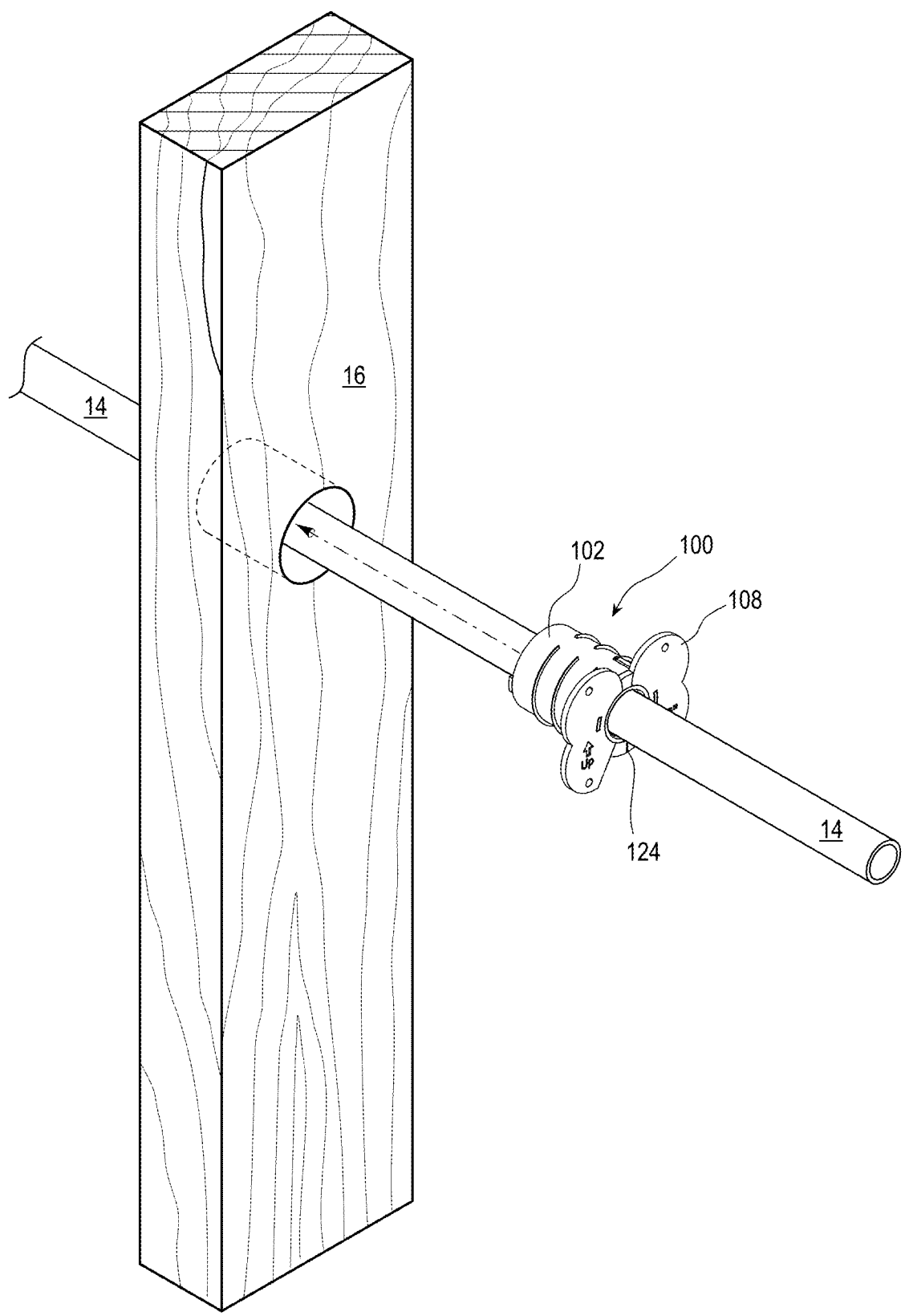
FIG. 4B shows the isolator and pipe of FIG. 4A, with the isolator positioned over the pipe, with the pipe to be protected received into the hollow channel of the isolator, before the isolator has been slid into the stud bore hole.
Figure 4C:
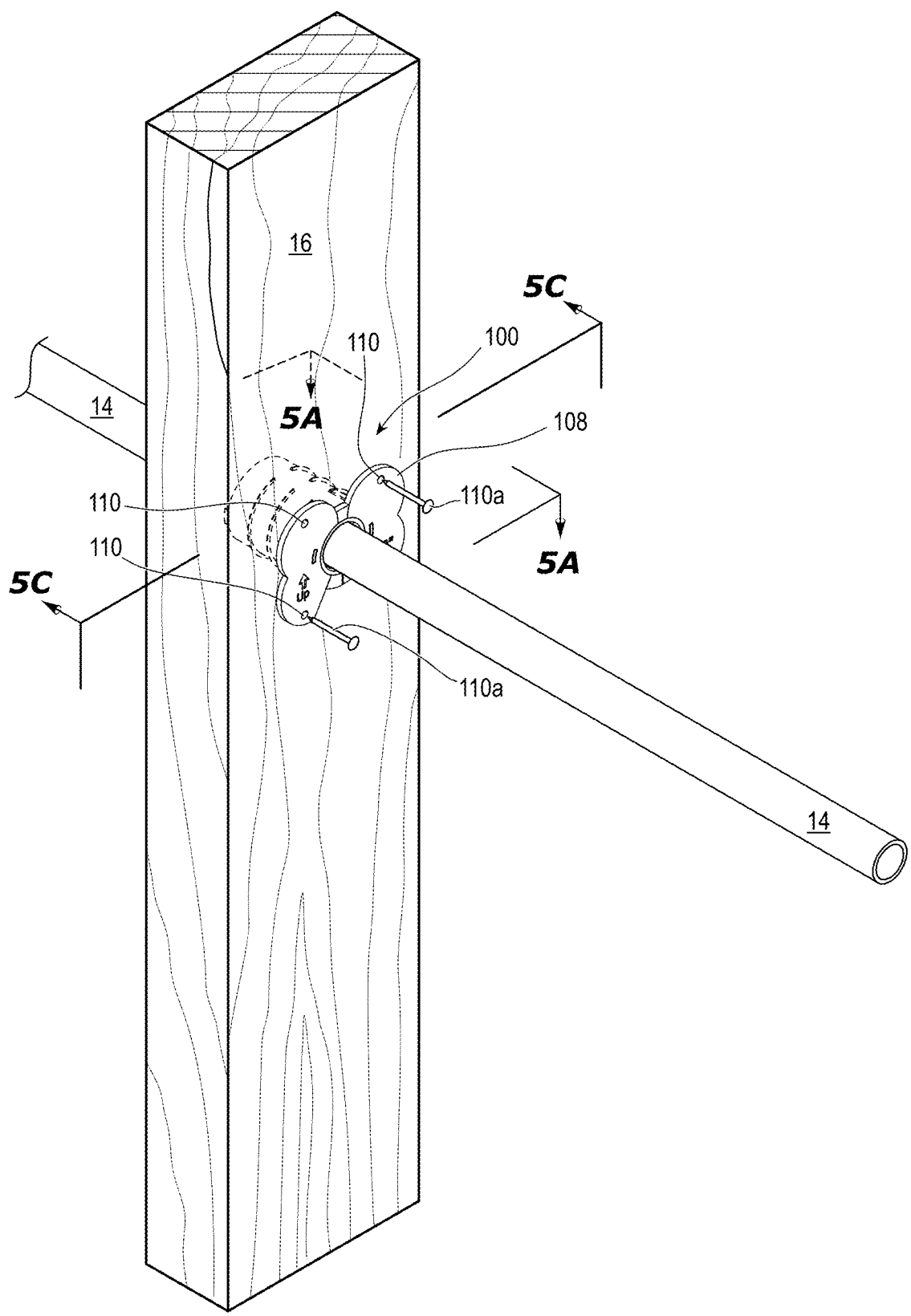
FIG. 4C shows the isolator and pipe of FIG. 4B, with the insertion body of the isolator inserted into the stud bore hole.
Figure 5A:
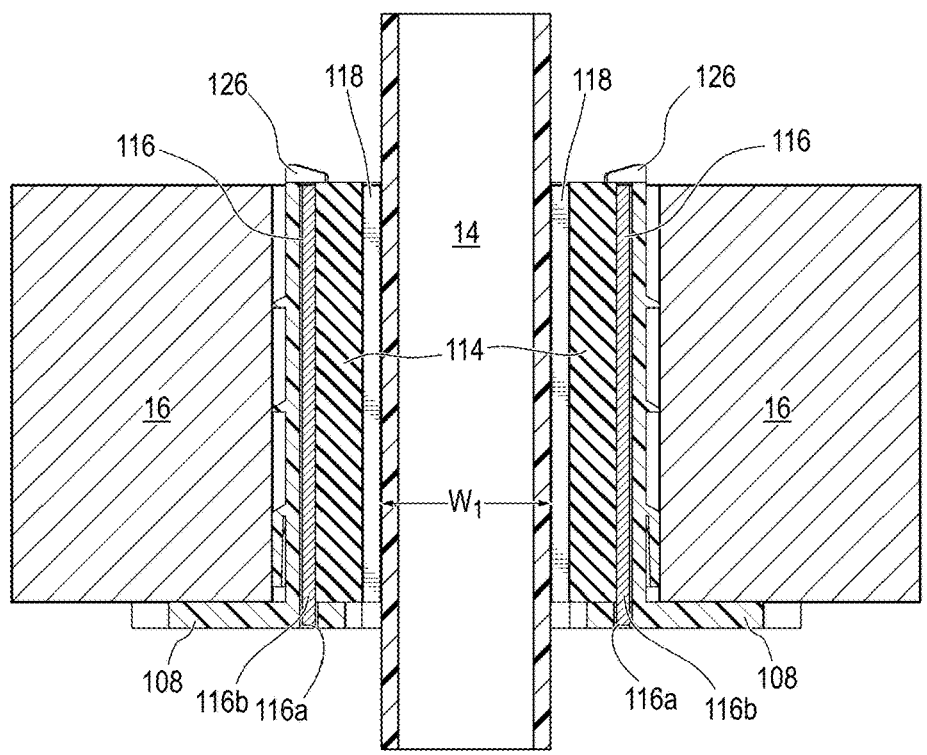
Figure 5B:
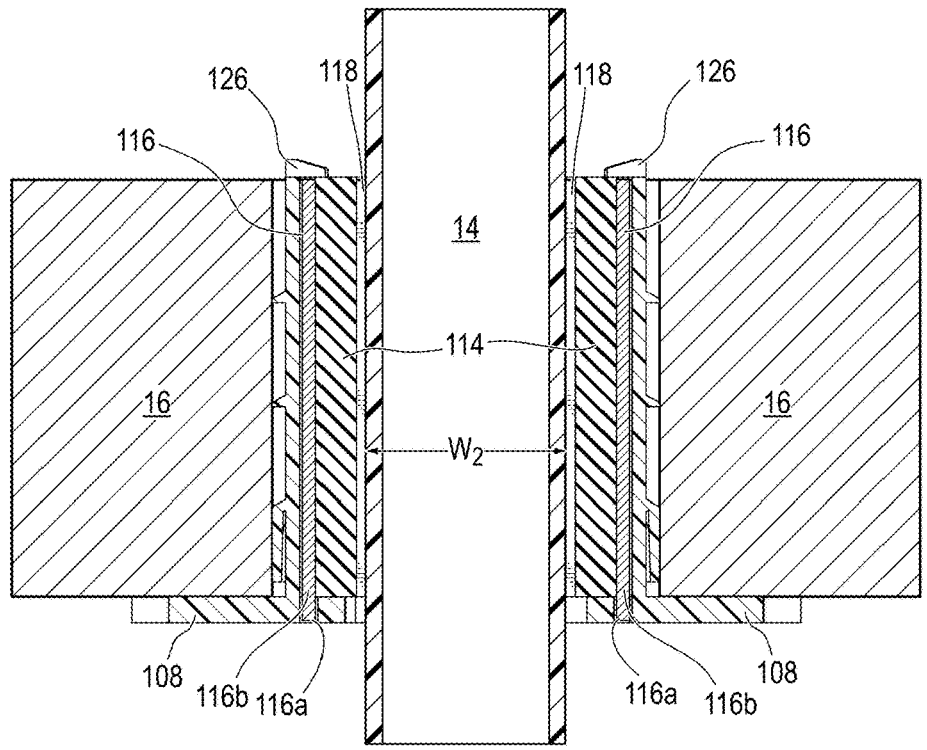

FIGS. 4A-4B illustrate how the isolator 100 may open up or spread open, about open seam 124, so as to allow the device 100 to be pressed over the pipe 14, even where the end of pipe 14 is not accessible. Where the pipe end is accessible, the device 100 can alternatively simply be slid over the end of the pipe, as will be apparent. As shown in FIG. 4B, once the pipe 14 is received within hollow channel 112, the device may be closed about open seam 124, and then the insertion body portion 102 of the device can be slid into the stud bore hole, as shown in FIG. 4C. FIGS. 5A-5D illustrate cross-sectional views through such a configuration. FIGS. 5A-5B show a longitudinal cross-section, taken along lines 5A-5A of FIG. 4C, while FIGS. 5C and 5D show a transverse cross-section, taken along lines 5C-5C of FIG. 4C. FIGS. 5A and 5C show how with a relatively smaller nominal size pipe 14, ribs 118 may contact pipe 14, to provide sound isolation. In an embodiment, the inward radial extension of such ribs 118 may be particularly configured to alternatively allow insertion of a larger nominal size pipe 14, where the ribs 118 may similarly contact pipe 14, but may be compressed as compared to use with the smaller size pipe. This allows a single device to be used with two or more different nominal sizes of pipe (e.g., $W_1$, that may be ½ inch and $W_2$, which may be ¾ inch, or any other two adjacent pipe sizes). FIGS. 5B and 5D illustrate such a configuration, used with the larger diameter pipe 14, showing increased compression of ribs 118. Alternatively, where two different isolators are provided for different nominal size pipes, the thickness of the elastomeric material of sound abatement layer 114 and/or the height of ribs 118 may simply be adjusted (e.g., thinner sound abatement layer and/or ribs to accommodate a relatively larger nominal pipe size).

FIGS. 6A-6H illustrate exemplary step by step instructions for how the device 100 may be installed. For example, FIGS. 6A-6D illustrate the device 100 being spread to an open position about seam 124, to facilitate pressing the open device over the pipe 14. When in the open position as shown in FIGS. 6C and 6D, the device 100 can be pressed downward, to position it over the pipe 14, as shown in FIGS. 6E-6F. Once in position over the pipe, the insertion body 102 may then be pressed into the bore hole through the stud 16, to push the faceplate 108 against the stud face, as shown in FIGS. 6G-6H.

The nail protection portion of the isolator (e.g., the metal collar) may be formed from any suitable material that meets the UPC requirements. An example of such is 16 gauge galvanized steel, although of course other materials (and thicknesses thereof) meeting the requirements are also possible. It will be appreciated that various other materials may also be used, so long as they meet any applicable code requirements. The insertion body and faceplate of the isolator may be formed from any suitable plastic material, e.g., including, but not limited to polyethylene, polypropylene, other polyolefins, ABS, PET, polyamide, or numerous other possible plastic materials. While plastic is a particular suitable material, it will be appreciated that use of other materials may also be possible. The sound abatement layer can be formed from silicone, rubber, another elastomeric material, or other suitable material that provides desired sound dampening performance criteria. Exemplary materials may be elastomeric, rubbery type materials, e.g., that are soft and resilient, so as to absorb vibration and sounds emanating from the plumbing pipes and/or water or other materials flowing therethrough. Exemplary materials may have a shore A hardness durometer value of about 60 or less, such as from 0 to about 60, from about 10 to about 50, from about 20 to about 50, from 30 to about 50, or from about 30 to about 40 (e.g., about 45) or the like. Shore OO materials having durometer values of less than about 100, such as from 20 to about 90, from about 30 to about 90, or from about 40 to about 90, or about 70 to about 90, may also be suitable. Those of skill in the art will appreciate that materials measured on the Shore OO scale are generally rubbers or other elastomeric materials that are very soft, while Shore A scale materials are generally rubber or other elastomeric materials that can range from very soft and flexible, to moderately flexible. Those of skill in the art will also appreciate that some materials may be measured on either or both such scales (e.g., a Shore A durometer hardness of about 45 may be similar to a Shore OO durometer hardness of about 80).

The particular materials selected for the sound abatement layer and/or the insertion body may be particularly selected to ensure no incompatibility problems with the material of the pipe being isolated. The sound abatement layer in particular may be selected from materials that will not undergo any significant embrittlement over time.

Any of the various described embodiments may be inserted around the pipe and can be adjusted in location before insertion into the stud. Additionally, with any of the various embodiments, the pipe may be repositioned within the stud wall even after the isolator is installed around the pipe and inserted into the stud.

In addition, any of the various described embodiments may be removed from the stud once inserted and then reinserted as needed in that or any other location.

In addition to the various noted benefits provided by the present devices, the devices also reduce the amount of metal needed to meet UPC code requirements, because the metal used to form the metal collar uses less metal than required in current conventional stud plates. For example, the present embodiments may require approximately 66% less metal, reducing manufacturing costs, and reducing freight volume by approximately 33%, and reducing freight weight by approximately 75% as compared to current solutions. The reduced mass and volume offers savings at all legs of the supply chain freight and storage, including but not limited to raw material and energy used in manufacture, shipment from manufacturer to wholesaler, wholesaler to distributor, distributor to customer, and customer to job site. The present devices also eliminate an entire SKU while still meeting the same code requirements. The present devices also save time during installation, as the present isolators provide combined isolation, nail protection and sound abatement, and can be installed using essentially the same method as existing stud isolators, without the need for any new or additional tools or processes. The present integrated devices will also eliminate incidence of failed building inspections, due to a missing nail plate, a common mistake made by installers because of the separate products and steps needed when using existing products that are not integrated as provided by the present invention. The present devices provide improved results or performance as they eliminate drywall distortion, making mudding/taping faster and simpler (as there are no underlying nail plates). The present devices also allow for uninterrupted use of stud surfaces for nail fastening, as there are no underlying traditional nail plates. Additionally, it ensures that one need only remove one side of drywall or gypsum wall board on renovations to provide nail protection on interior walls (the methods, devices and systems do not require access to both wall surfaces in case of a remodel, etc.)

While described herein principally in the context of plumbing pipes, it will be appreciated that the present devices could also be used to provide nail protection for other utility runs within a wall (e.g., electrical runs or the like).

While principally described in the context of isolators that include a sound abatement layer, the present disclosure also extends to configurations that may not necessarily include such a sound abatement layer (e.g., similar to U.S. Pat. No. 11,852,273, but including any features from embodiments described herein).

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

As used herein, the term "between" includes any referenced endpoints. For example, "between 2 and 10" includes both 2 and 10.

It must be noted that, as used in this specification and the appended claims, the singular forms "a," "an" and "the" include plural referents unless the content clearly dictates otherwise.

Unless otherwise stated, all percentages, ratios, parts, and amounts used and described herein are by weight.

Some ranges may be disclosed herein. Additional ranges may be defined between any values disclosed herein as being exemplary of a particular parameter. All such ranges are contemplated and within the scope of the present disclosure.

In reference to various standardized tests (e.g., ASTM or other tests), it will be understood that reference to any such standard refers to the latest update (if any) of such standard (at the time of application), unless otherwise indicated. Any such referenced standards are incorporated herein by reference, in their entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure. Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A plumbing stud isolator with integrated nail protection and sound abatement comprising:
   an insertion body sized and configured for insertion into a bore hole through a stud, wherein the insertion body includes a periphery that engages with edges of the bore hole through the stud, the insertion body including an insertion end and a front end;
   a faceplate attached to the front end of the insertion body, wherein the faceplate has a size and shape that is larger than the bore hole through the stud, so as to serve as a stop against the stud, when the insertion body is inserted into the bore hole through the stud;
   the insertion body including a hollow channel for receipt of a plumbing pipe extending through the bore hole through the stud;
   a sound abatement layer received within the insertion body, at least partially surrounding the hollow channel, so that the sound abatement layer at least partially surrounds the plumbing pipe during use; and
   a nail protection collar also received within the insertion body, radially outward from the sound abatement layer, so that the nail protection collar generally surrounds the sound abatement layer and the plumbing pipe received therein;
   wherein the nail protection collar is configured as two initially separate pieces each having a generally c-shaped or generally semi-circular cross section, positioned with the sound abatement layer into the hollow channel of the insertion body so that the nail protection collar forms a clamshell cylindrical shape once positioned over the sound abatement layer.

2. The plumbing stud isolator with integrated nail protection and sound abatement as recited in claim 1, wherein the sound abatement layer further includes a plurality of pipe engaging ribs extending radially inwardly from the sound abatement layer into the hollow channel.

3. The plumbing stud isolator with integrated nail protection and sound abatement as recited in claim 1, wherein the nail protection collar is visible at the insertion end of the insertion body, and the faceplate at the front end includes one or more cut-outs that are aligned with the nail protection collar, so as to allow a user to visibly verify that the nail protection collar is properly positioned, from either end of the isolator, once the isolator is installed in a stud.

4. The plumbing stud isolator with integrated nail protection and sound abatement as recited in claim 1, wherein the nail protection collar is configured as a generally hollow cylindrical shape.

5. The plumbing stud isolator with integrated nail protection and sound abatement as recited in claim 1, wherein the nail protection collar is configured as a generally hollow cylindrical shape that fits over the sound abatement layer, the generally hollow cylindrical shape including one or more discontinuities adjacent a top and/or bottom of the nail protection collar.

6. The plumbing stud isolator with integrated nail protection and sound abatement as recited in claim 1, wherein the insertion body is formed of plastic and is sufficiently flexible so as to allow the insertion body with the nail protection collar and sound abatement layer received therein to flex open, and be placed over the plumbing pipe.

7. The plumbing stud isolator with integrated nail protection and sound abatement as recited in claim 1, wherein sound abatement layer is formed from silicone, rubber or another elastomeric material.

8. The plumbing stud isolator with integrated nail protection and sound abatement as recited in claim 1, wherein the nail protection collar is formed from metal.

9. The plumbing stud isolator with integrated nail protection and sound abatement as recited in claim 1, wherein the faceplate includes one or more holes therethrough, for receipt of nails or another fastener to secure the isolator to a face of a stud.

10. The plumbing stud isolator with integrated nail protection and sound abatement as recited in claim 1, wherein the insertion body further comprises one or more retention tabs or clasps at the insertion end for engagement with the nail protection collar and/or sound abatement layer, to retain the nail protection collar and/or sound abatement layer within the insertion body.

11. The plumbing stud isolator with integrated nail protection and sound abatement as recited in claim 1, wherein the faceplate includes one or more cut-outs that are aligned with the nail protection collar, so as to allow a user to visibly verify that the nail protection collar is properly positioned within the insertion body, when viewed from the front end, once the isolator is installed in a stud.

12. The plumbing stud isolator with integrated nail protection and sound abatement as recited in claim 1, wherein the insertion body includes an open seam, so as to allow the insertion body to be pressed over a plumbing pipe even when an end of the plumbing pipe is not accessible.

13. The plumbing stud isolator with integrated nail protection and sound abatement as recited in claim 12, wherein the nail protection collar includes a gap that is aligned with the open seam of the insertion body.

14. A plumbing stud isolator with integrated nail protection and sound abatement comprising:
   an insertion body sized and configured for insertion into a bore hole through a stud, wherein the insertion body includes a periphery that engages with edges of the bore hole through the stud, the insertion body including an insertion end, a front end, and an open seam, so as to allow the insertion body to be pressed over a plumbing pipe even where an end of the plumbing pipe is not accessible;

a faceplate attached to the front end of the insertion body, wherein the faceplate has a size and shape that is larger than the bore hole through the stud, so as to serve as a stop against the stud, when the insertion body is inserted into the bore hole through the stud;

the insertion body including a hollow channel for receipt of the plumbing pipe extending through the bore hole through the stud, wherein the plumbing pipe is received by the insertion body by spreading at the open seam, a sound abatement layer received within the insertion body, at least partially surrounding the plumbing pipe during use; and a metal nail protection collar also received within the insertion body, radially outward from the sound abatement layer, so that the nail protection collar generally surrounds the sound abatement layer and the plumbing pipe received therein, wherein the metal nail protection collar includes a gap that is aligned with the open seam of the insertion body.

15. The plumbing stud isolator with integrated nail protection and sound abatement as recited in claim 14, wherein the insertion body further comprises one or more retention tabs or clasps at the insertion end for engagement with the nail protection collar and/or sound abatement layer, to retain the nail protection collar and/or sound abatement layer within the insertion body.

16. The plumbing stud isolator with integrated nail protection and sound abatement as recited in claim 14, wherein the faceplate includes one or more cut-outs that are aligned with the nail protection collar, so as to allow a user to visibly verify that the nail protection collar is properly positioned, when viewed from the front end, once the isolator is installed in a stud.

17. A method of installing a plumbing stud isolator with integrated nail protection and sound abatement, the method comprising:
(i) providing a stud isolator with integrated nail protection and sound abatement comprising:
an insertion body sized and configured for insertion into a bore hole through a stud, wherein the insertion body includes a periphery that engages with edges of the bore hole through the stud, and/or extends outward towards edges of the bore hole through the stud, the insertion body including an insertion end, a front end, and an open seam, so as to allow the insertion body to be pressed over a plumbing pipe even where an end of the plumbing pipe is not accessible;
a faceplate attached to the front end of the insertion body, wherein the faceplate has a size and shape that is larger than the bore hole through the stud, so as to serve as a stop against the stud, when the insertion body is inserted into the bore hole through the stud;
the insertion body including a hollow channel for receipt of the plumbing pipe extending through the bore hole through the stud, wherein the plumbing pipe is received by the insertion body by spreading at the open seam;
the stud isolator including a sound abatement layer and a metal nail protection collar received within the insertion body, the metal nail protection collar being positioned radially outward from the sound abatement layer, so that the metal nail protection collar generally surrounds the sound abatement layer, wherein the metal nail protection collar and sound abatement layer include a gap that is aligned with the open seam of the insertion body;
(ii) positioning the nail protection collar over a plumbing pipe; and
(iii) inserting the insertion body with the nail protection collar and sound abatement layer therein into the bore hole of the stud, so as to provide both sound abatement and nail protection to the plumbing pipe, without installation of any nail protection plate over a face of the stud.

18. The method as recited in claim 17, wherein the sound abatement layer is formed from silicone, rubber or another elastomeric material.

19. The method as recited in claim 17, wherein the nail protection collar is visible once installed with the insertion body into the bore hole through the stud, so as to allow a user or building inspector to visibly verify that the nail protection collar is properly installed, once the isolator is installed in the stud.

20. A plumbing stud isolator with integrated nail protection comprising:
an insertion body sized and configured for insertion into a bore hole through a stud, wherein the insertion body includes a periphery that engages with edges of the bore hole through the stud, the insertion body including an insertion end, a front end, and an open seam, so as to allow the insertion body to be pressed over a plumbing pipe even where an end of the plumbing pipe is not accessible;
a faceplate attached to the front end of the insertion body, wherein the faceplate has a size and shape that is larger than the bore hole through the stud, so as to serve as a stop against the stud, when the insertion body is inserted into the bore hole through the stud;
the insertion body including a hollow channel for receipt of the plumbing pipe extending through the bore hole through the stud, wherein the plumbing pipe is received by the insertion body by spreading at the open seam, and
a nail protection collar received within the insertion body, so that the nail protection collar generally surrounds the plumbing pipe received within the hollow channel, wherein the metal nail protection collar includes a gap that is aligned with the open seam of the insertion body.

21. The plumbing stud isolator with integrated nail protection as recited in claim 20, wherein the isolator further includes a plurality of flexible or elastomeric pipe engaging ribs extending radially inwardly from the insertion body into the hollow channel.

22. The plumbing stud isolator with integrated nail protection as recited in claim 21, wherein the flexible or elastomeric pipe engaging ribs are sized to accommodate receipt of either a nominal ¾ inch plumping pipe, or a nominal ½ inch plumping pipe into the hollow channel, as selected by a user.

23. The plumbing stud isolator with integrated nail protection as recited in claim 20, wherein the nail protection collar is configured as two initially separate pieces each having a generally c-shaped or generally semi-circular cross section, positioned with the sound abatement layer in the hollow channel of the insertion body so that the nail protection collar forms a clamshell cylindrical shape with the sound abatement layer.

24. The plumbing stud isolator with integrated nail protection as recited in claim 20, wherein the nail protection collar is configured as a generally hollow cylindrical shape including one or more discontinuities adjacent a top and/or bottom of the nail protection collar.

25. The plumbing stud isolator with integrated nail protection as recited in claim 20, wherein the faceplate includes one or more cut-outs that are aligned with the nail protection collar, so as to allow a user to visibly verify that the nail protection collar is properly positioned within the insertion body, when viewed from the front end, once the isolator is installed in a stud.

26. The plumbing stud isolator with integrated nail protection as recited in claim 20, wherein the insertion body includes one or more of flexible ridges, biased flanges, registration pads or other structure for ensuring that the isolator engages with and properly nests within the bore hole of a stud.

27. A plumbing stud isolator with integrated nail protection and sound abatement comprising:
  an insertion body sized and configured for insertion into a bore hole through a stud, wherein the insertion body includes a periphery that engages with edges of the bore hole through the stud, the insertion body including an insertion end and a front end;
  a faceplate attached to the front end of the insertion body, wherein the faceplate has a size and shape that is larger than the bore hole through the stud, so as to serve as a stop against the stud, when the insertion body is inserted into the bore hole through the stud;
  the insertion body including a hollow channel for receipt of a plumbing pipe extending through the bore hole through the stud;
  a sound abatement layer received within the insertion body, at least partially surrounding the hollow channel, so that the sound abatement layer at least partially surrounds the plumbing pipe during use; and
  a nail protection collar also received within the insertion body, radially outward from the sound abatement layer, so that the nail protection collar generally surrounds the sound abatement layer and the plumbing pipe received therein;
  wherein the insertion body further comprises one or more retention tabs or clasps at the insertion end for engagement with the nail protection collar and/or sound abatement layer, to retain the nail protection collar and/or sound abatement layer within the insertion body.

28. A plumbing stud isolator with integrated nail protection and sound abatement comprising:
  an insertion body sized and configured for insertion into a bore hole through a stud, wherein the insertion body includes a periphery that engages with edges of the bore hole through the stud, the insertion body including an insertion end and a front end;
  a faceplate attached to the front end of the insertion body, wherein the faceplate has a size and shape that is larger than the bore hole through the stud, so as to serve as a stop against the stud, when the insertion body is inserted into the bore hole through the stud;
  the insertion body including a hollow channel for receipt of a plumbing pipe extending through the bore hole through the stud;
  a sound abatement layer received within the insertion body, at least partially surrounding the hollow channel, so that the sound abatement layer at least partially surrounds the plumbing pipe during use; and
  a nail protection collar also received within the insertion body, radially outward from the sound abatement layer, so that the nail protection collar generally surrounds the sound abatement layer and the plumbing pipe received therein;
  wherein the insertion body includes an open seam, so as to allow the insertion body to be pressed over a plumbing pipe even when an end of the plumbing pipe is not accessible;
  wherein the nail protection collar includes a gap that is aligned with the open seam of the insertion body.

\* \* \* \* \*